United States Patent
Pfleging, Jr. et al.

(10) Patent No.: US 7,152,848 B2
(45) Date of Patent: Dec. 26, 2006

(54) TELESCOPING LEG ASSEMBLY FOR SEMITRAILERS

(75) Inventors: Richard J. Pfleging, Jr., St. Charles, MO (US); Matthew P. Tubbe, Woodstock (CA); Gary D. Hensiek, Warrenton, MO (US); Kim G. Baechler, London (CA)

(73) Assignee: The Holland Group, Inc., Holland, MI (US)

( * ) Notice: Subject to any disclaimer, the term of this patent is extended or adjusted under 35 U.S.C. 154(b) by 203 days.

(21) Appl. No.: 10/892,860

(22) Filed: Jul. 16, 2004

(65) Prior Publication Data

US 2005/0012304 A1 Jan. 20, 2005

Related U.S. Application Data

(60) Provisional application No. 60/488,682, filed on Jul. 18, 2003.

(51) Int. Cl.
*B60S 9/04* (2006.01)
(52) U.S. Cl. ........................ 254/419; 254/425; 280/475
(58) Field of Classification Search ........ 254/419–425; 384/419–420, 475; 280/475
See application file for complete search history.

(56) References Cited

U.S. PATENT DOCUMENTS

| | | | |
|---|---|---|---|
| 4,466,527 A | 8/1984 | Billet | |
| 4,607,182 A | 8/1986 | Ballhaus | |
| 4,699,530 A | 10/1987 | Satoh et al. | |
| 4,795,276 A | 1/1989 | Damji | |
| 4,938,090 A | 7/1990 | Brusasco | |
| 5,009,523 A * | 4/1991 | Folger et al. | 384/475 |
| 5,230,567 A | 7/1993 | Takeuchi | |
| 5,417,500 A | 5/1995 | Martinie | |
| 5,603,206 A | 2/1997 | Horchler, Jr. | |
| 5,944,426 A | 8/1999 | Eum et al. | |
| 6,099,016 A * | 8/2000 | Peveler | 280/475 |
| 6,186,668 B1 | 2/2001 | Beaman | |
| 6,267,357 B1 | 7/2001 | Ebey et al. | |
| 6,558,043 B1 | 5/2003 | Beghini et al. | |
| 2002/0181816 A1 * | 12/2002 | Boyd et al. | 384/475 |
| 2003/0168648 A1 * | 9/2003 | Alguera Gallego et al. | 254/419 |
| 2005/0161656 A1 * | 7/2005 | Riedl | 254/419 |

OTHER PUBLICATIONS

Exhibit A is a leg of a prior art landing gear sold at least as early as Jul. 1, 2002.

* cited by examiner

*Primary Examiner*—Lee D. Wilson
(74) *Attorney, Agent, or Firm*—Price, Heneveld, Cooper, DeWitt & Litton, LLP (57) ABSTRACT

A thrust bearing for receiving thrust loads along the axis of a rotating shaft. The thrust bearing comprising a first bearing member having a race, a second bearing member having a race and ball bearings received in the races of the first and second bearing members for permitting relative rotating motion of the first and second bearing members. The second bearing member being formed to engage a rotating shaft to transmit axial forces between the shaft and the thrust bearing.

21 Claims, 8 Drawing Sheets

TELESCOPING LEG ASSEMBLY FOR SEMITRAILERS

CROSS-REFERENCE TO RELATED APPLICATIONS

The present application claims the benefit of U.S. Provisional Patent Application No. 60/488,682, filed Jul. 18, 2003, entitled THRUST BEARING, the entire contents of which is hereby incorporated herein by reference.

BACKGROUND OF THE INVENTION

This invention relates generally to landing gear for semitrailers and more particularly to thrust bearings and collars used in landing gear.

Semitrailers typically having landing gear which may be extended to support the trailer when the trailer is uncoupled from the tractor. Conventional landing gear includes a body attached to the vehicle and a telescoping leg received in the body. A screw shaft rotatably connected to the body has external threads which engage internal threads in a nut attached to the leg. The screw shaft is rotated in the one direction to move the leg downward relative to the body into an extended position in which the landing gear engages the ground to support the trailer. The screw shaft is rotated in an opposite direction to move the leg upward relative to the body into a retracted position in which the landing gear clears the ground for transporting the trailer with the tractor.

Among the numerous components of conventional landing gear assembly are a thrust bearing and a collar. The thrust bearing is mounted on the screw shaft below a bearing block to journal the shaft for rotation on its axis. The collar, mounted on the shaft below the bearing, distributes loads from the shaft to the bearing. During initial assembly, the assembler fixes the collar on a shoulder of the screw shaft or, alternatively, welds the collar to the shaft, which eliminates the need for the shaft shoulder. Next, the thrust bearing is placed on the shaft such that the lower race is adjacent the collar. As a result, two separate components, a thrust bearing and a collar, are required to be positioned during the assembly of a conventional landing gear.

It is typically desirable for manufacturers of assembled goods to minimize the number of components needed for final assemblage of their product. Such minimization usually results in reduced costs by cutting labor costs, handling costs, processing costs and transportation costs. Labor costs are reduced because the assembler can assemble the product with fewer steps and therefore potentially less time. Since assemblers are commonly paid on an hourly basis, less time necessary for the assemblage of a unit results directly in a reduction of labor costs because more units can be produced during a given time period.

In addition, the transportation and handling costs are reduced. Typically, parts used in the assembling processes are manufactured at a facility or facilities separate from that in which assembly occurs. Furthermore, it is not uncommon that the various components are manufactured by one or more vendors. Accordingly, each component used in the assembling of a product needs to be shipped to the assembling facility, unloaded, stored, inventoried and transported from storage to the assembling station when needed. In addition, costs are incurred for each component by placing orders, processing accounts payables for delivered goods, maintaining quality assurance and managing the receiving department. Accordingly, if the number of parts that need to be inventoried, ordered, shipped, unloaded, stored and invoiced are reduced, the labor and associated costs for each of these activities are also reduced.

BRIEF DESCRIPTION OF THE DRAWINGS

FIG. 2b is a longitudinal section of the side elevation of the leg of the prior art landing gear of FIG. 2a;

FIG. 6b is a section of the thrust bearing taken in the plane of line A—A of FIG. 6a;

FIG. 7b is a cross section of the FIG. 7a thrust bearing taken in the plane of line A—A of FIG. 7a.

DETAILED DESCRIPTION OF PREFERRED EMBODIMENT

Figure 1:
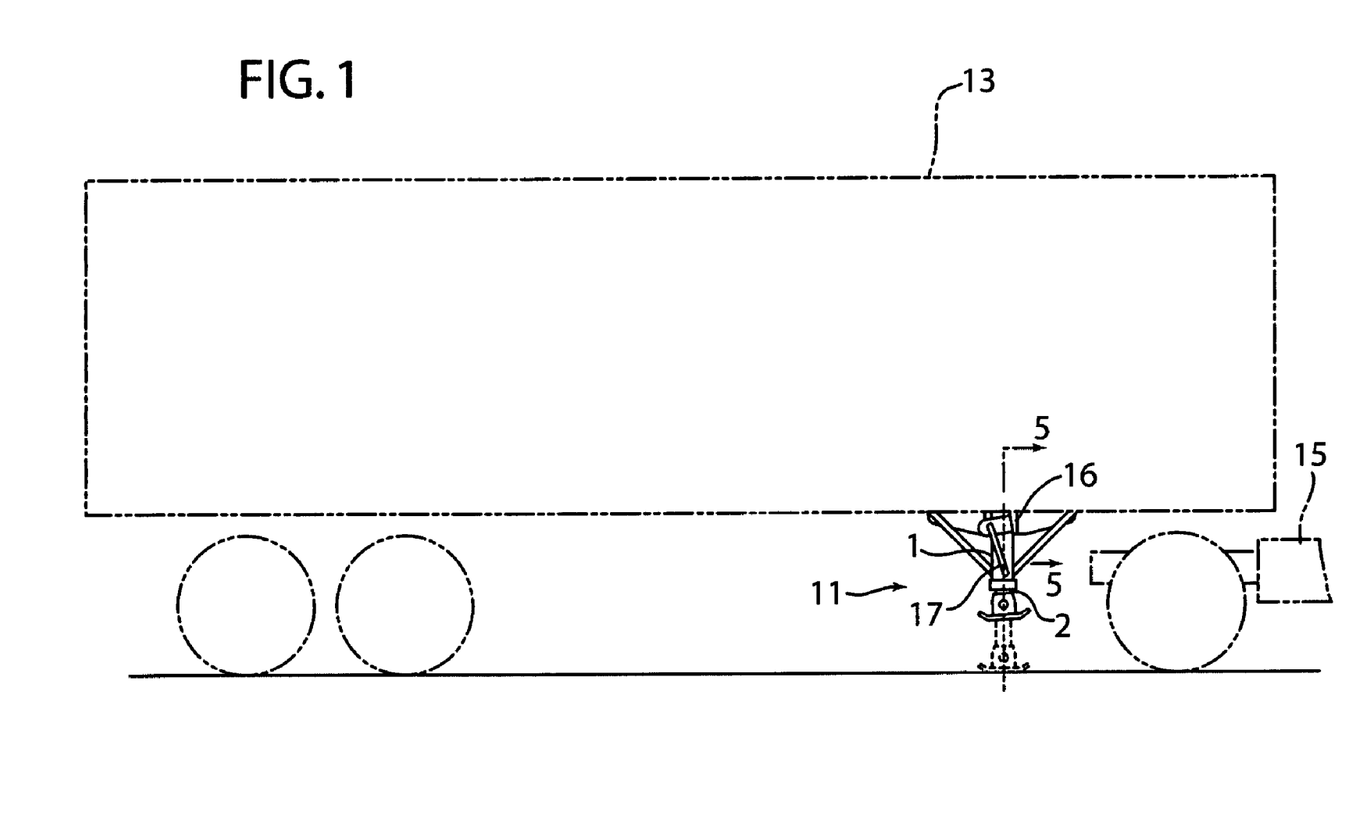
FIG. 1 is a side elevation of a landing gear shown in relation to a fragmentary schematic of a tractor and semitrailer in phantom.

FIG. 1 illustrates landing gear, indicated generally at 11, for the support of semitrailers when not attached to a tractor. The landing gear typically includes a pair of legs (only one leg is shown) located near respective front corners of a semitrailer. Each leg is capable of extending to engage the pavement or other supporting surface to hold up the front end of the semitrailer as is well understood in the art. A shoe of the landing gear is pivotally mounted on the leg for engaging the pavement. The legs are also capable of retracting to move up out of the way when the semitrailer is being pulled over the road by a tractor (not shown). The following description is confined to one of the legs. The other leg (not shown) has a similar construction, but if it is connected to gearing of the illustrated leg such as by an output shaft extending underneath the front of the semitrailer, the other leg need not have some of the gearing present in the illustrated leg. Such constructions are well understood by those of ordinary skill in the art and will not be further described herein.

The landing gear leg includes a lower leg section 2 telescopingly received in an upper leg section 1. The lower leg section 2 is a steel square tube. The upper leg section 1 is preferably a square tube made of steel or other like material. The upper leg section 1 has internal dimensions larger than that of the lower leg section 2 so that the lower leg section is telescopingly received in the upper leg section 1. The lower and upper leg sections 2, 1 could also have other cross sectional shapes, such as rectangular, round or the like. In still another version, the upper leg section 1 is a steel channel having an open front side extending the length of the upper leg section. A mounting plate 16 for attaching the leg to the trailer is attached by bolts and/or welding to the upper leg section 1. Holes in the mounting plate 16 may receive fasteners (not shown) for attaching the leg to the trailer. The leg can be attached to the trailer in either a "conventional mount" and "reverse mount". These labels will be understood by those of ordinary skill in the art and will not be discussed further.

The landing gear leg includes an input shaft received through the outside cover plate into the leg and an output shaft received through the inside cover plate of the leg. The input shaft and output shaft are connected together by a subassembly (not shown) further including gearing. The gearing subassembly is mounted in a gear box attached to the side of the leg. However, the gearing subassembly may be mounted within the leg without departing from the scope of the present invention. Such constructions are well understood by those of ordinary skill in the art and will not be further described herein.

The lower and upper leg sections 2, 1 are connected together by a screw shaft 31 for extension and retraction of the lower leg section relative to the upper leg section upon rotation of the screw shaft 31. The rotation of a crank handle attached to the gearing subassembly extends or retracts the landing gear as a result of the gearing subassembly transferring the force applied by rotating the crank handle to the screw shaft 31. The screw shaft includes a shaft segment and threaded segment. The threaded segment has male threads adapted for engagement with female threads incorporated in the leg section. Accordingly, as the screw shaft 31 is rotated the lower leg section 2, depending on rotation direction, either travels upward retracting the lower leg section into the upper leg section 1 or extending it from the upper leg section.

The operation of the landing gear is as follows. Assuming the lower leg section 2 is retracted into the upper leg section 1 and is to be extended, the driver first positions the trailer using the tractor so that the landing gear shoes will rest on a firm level surface when extended. By selecting a high gear on the gear subassembly, the driver can extend the lower leg section 2 rapidly from the upper leg section 1 for bringing the leg into contact with the pavement by rotating a crank handle in a counterclockwise direction. Once the leg contacts the pavement, it will be necessary to increase the mechanical advantage provided by the gearing to lift the semitrailer off of the fifth wheel of the tractor (not shown). To do this, the driver shifts the gear from high gear to low gear and then resumes rotating the crank handle in the counterclockwise direction. Low gear moves the landing assembly at a slower rate, but with greater lift to raise the semitrailer and its load. The landing gear can be retracted from an extended position into the upper leg section 1 by rotating the crank handle in the opposite direction. It is understood that the landing gear can be extended by turning the crank handle in a counterclockwise direction without departing from the scope of this invention.

Figure 5:
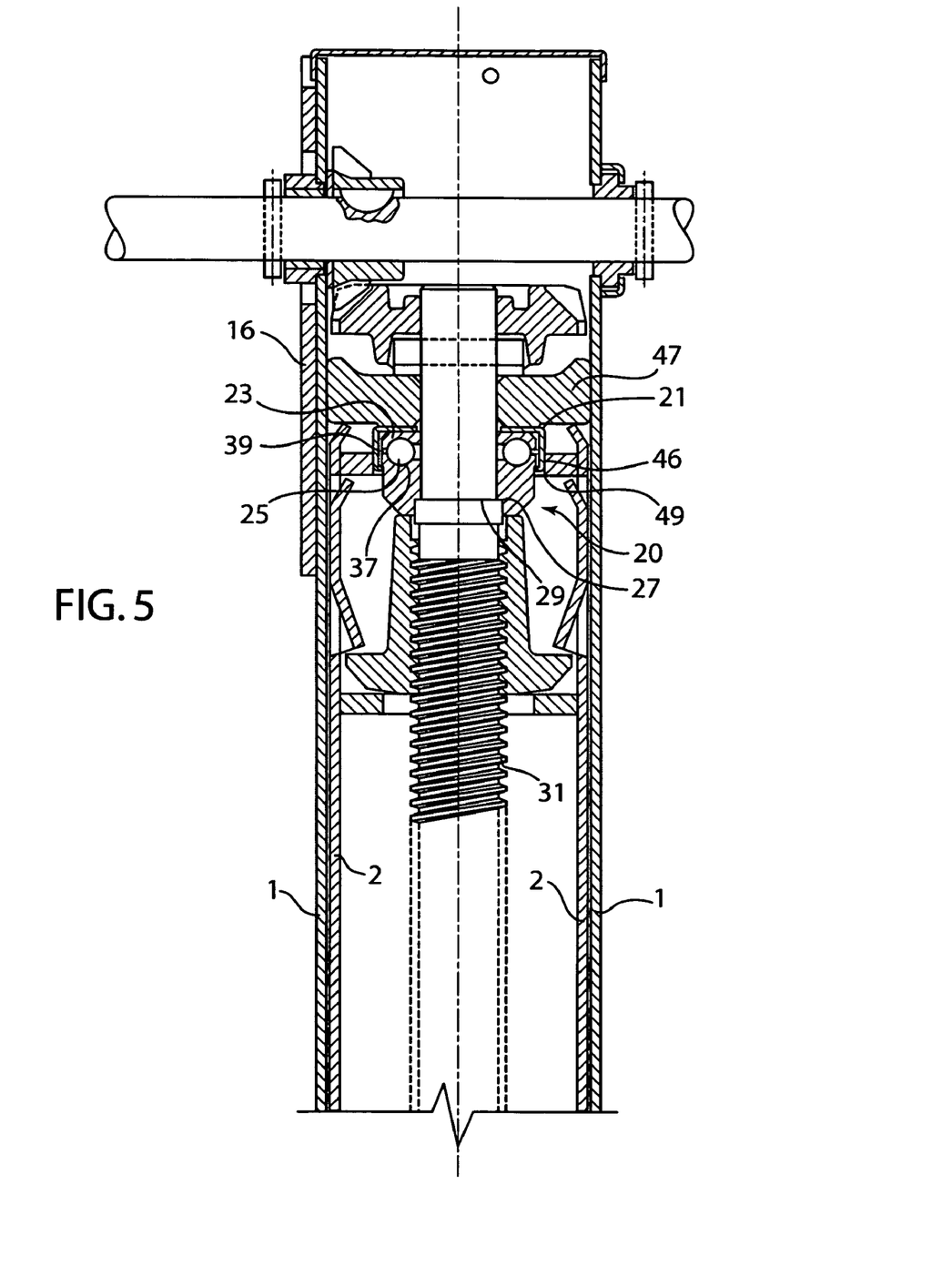
FIG. 5 is a fragmentary section of the side elevation of the leg of landing gear of the present invention taken in the plane including line 5—5 of FIG. 1.

A thrust bearing of the present invention, indicated generally at 20, is an axial load bearing assembly that includes an integral collar, such that a separate collar is not required. The thrust bearing 20 is subjected to substantial loading by the semitrailer it is supporting, particularly if the semitrailer is loaded with sundries. The semitrailer's load is transferred through the mounting plate 16 to the upper leg section 1, from the upper leg section 1 to a bearing block 47 welded within the upper leg section 1, from the bearing block to the thrust bearing 20 which rests against the bearing block 47, from the thrust bearing 20 to the shaft 31, from the shaft to the foot and from the foot to the underlying pavement. In one embodiment, the thrust bearing 20 must be able to withstand 90,000 pounds of vertical load. As a result, each individual component of the bearing member must also be able to withstand substantial loading.

As the legs of the landing gear are being extended or retracted, free rotation along the engagement faces of the screw 31 and upper leg section 1 is enabled by the use of the bearing block 47 and thrust bearing 20. The bearing block 47, which also acts as a bushing to support the shaft in a generally fixed lateral position with respect to the body, transfer the load to the underlying thrust bearing 20. The thrust bearing 20 is mounted on the shaft 31 to journal the shaft for rotation on its axis, and to distribute loads from the bearing 20 to the shaft. The thrust bearing 20 is formed with a mating shoulder 27 for engaging a shoulder 29 of the shaft and preventing thrust bearing 20 from moving axially along the shaft 31.

Figure 6A:
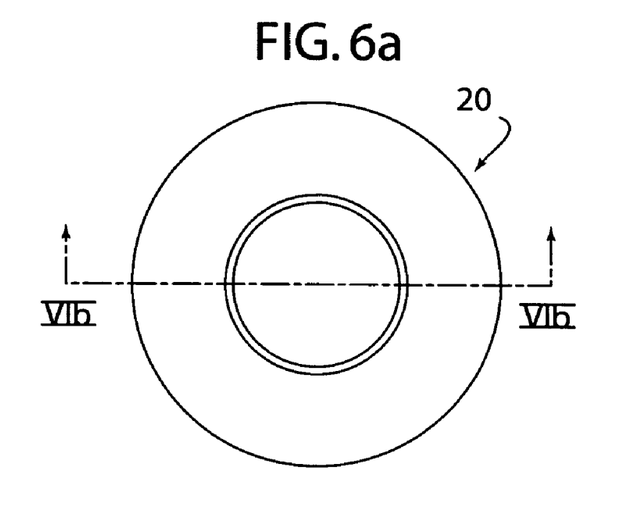
FIG. 6a is a top plan view of a thrust bearing of the landing gear leg shown in FIG. 5.
Figure 6B:
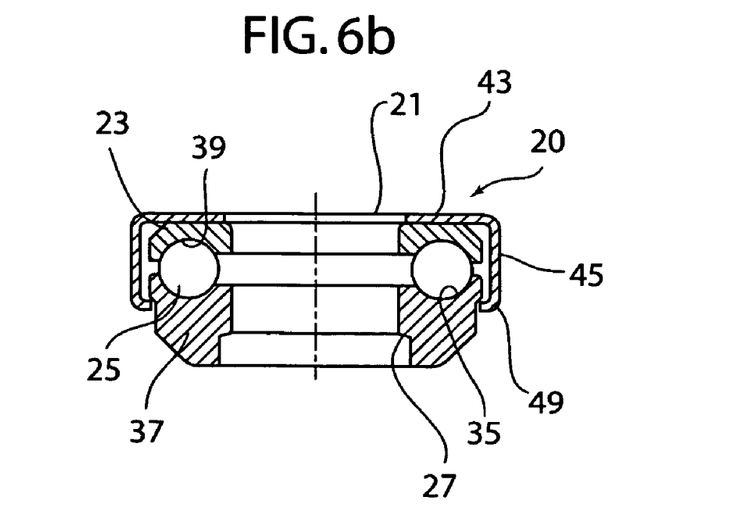

The thrust bearing 20 includes a first bearing member 23 having a race 39, a second bearing member 37 having a race 35, ball bearings 25 (broadly, "rollers") received in the races of the first and second bearing members. The thrust bearing 20 further includes a sleeve 21 for interconnecting the first bearing member, second bearing member and ball bearings in an integrated assembly.

The first bearing member 23, ball bearings 25 and sleeve 21 are similar to those of a conventional thrust bearing adapted for substantial loading. The first bearing member 23 has a generally flat upper surface for engaging the bottom surface of the horizontal portion of the sleeve for transferring axial loads from the bearing block 47 to the thrust bearing 20. The race 39 in the first bearing member 23 is similar. The ball bearings 25 are sized and shaped to permit free rotation between the first bearing member 23 and the second bearing member 37. It is to be understood that while ball bearings are shown, other types of rollers (e.g., cylindrical pins) may be used without departing from the scope of the present invention. The second bearing member 37 includes an integral collar, as described in further detail below. The sleeve 21 comprises a web having a horizontal portion 43 (FIG. 6a) with generally flat upper and bottom surfaces, a flange 45 extending along the outer peripheral edge downward to a position adjacent the second bearing member 37 and a lip 44 extending from the bottom of the flange 45 for engaging a corresponding notch in the second bearing member 37 for securing the first and second bearing members 23, 37, respectively, and ball bearings 25 together.

The second bearing member 37, a unitary structure, includes both the race 35 to permit rotation and a shoulder 27 to transfer force to the shaft 31. A detailed description of the race is provided above. The shoulder 27 of the second bearing member 37 engages the mating shoulder 29 of the shaft 31 to transmit axial forces from the shaft to the thrust bearing 20 and prevent axial movement of the thrust bearing. Other structures for transmitting axial loads from the bearing 20 to the shaft 31 may be used without departing from the scope of the invention. For example, the second bearing member 37 may be welded to the shaft 31, which would eliminate the need for the shaft shoulder 29. As described above, the second bearing member 37 is at least partially axially loaded with the substantial weight of a semitrailer.

Accordingly, the second bearing member 37 is constructed of materials suitable for such loading such as, but not limited to, cold drawn steel, sintered iron alloy-copper infiltrated steel or hardened carbon steel.

Figure 7A:
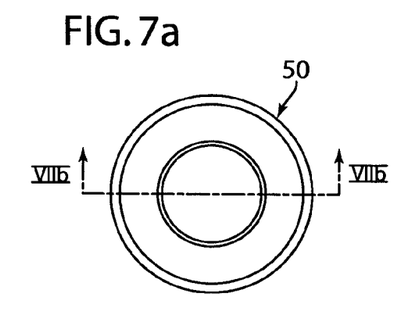
FIG. 7a is a top plan view of another embodiment of the thrust bearing of the present invention.
Figure 7B:
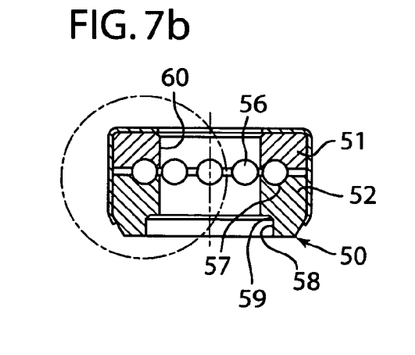
Figure 7C:
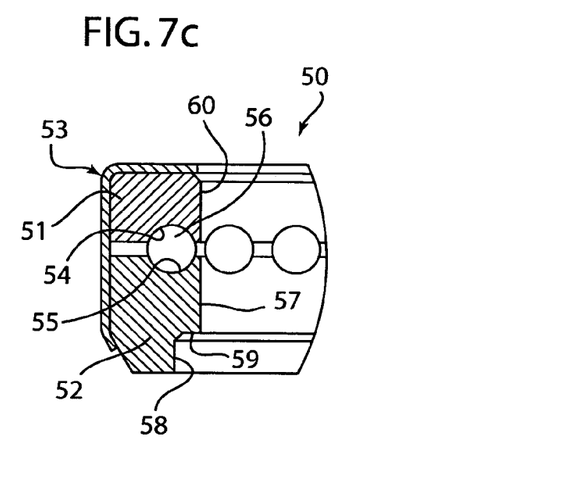
FIG. 7c is an enlarged fragmentary view of the section of FIG. 7b.

With reference to FIGS. 7a–7c, a thrust bearing 50 according to another aspect of the present invention includes a first bearing member 51 having a first race 54 and a second bearing member 52 having a second race 55, and a plurality of ball bearings 56. A sleeve 53 operably connects the first bearing member 51 to the second bearing member 52. Second bearing member 52 includes a first diameter bore 57 having the same diameter as bore 60 of first bearing member 51. Second bearing member 52 also includes a second diameter portion 58 and a shoulder 59 configured to engage shoulder 29 of screw 31. Second bearing member 52 thereby forms an integral collar such that a separate collar is not required.

Figure 2A:
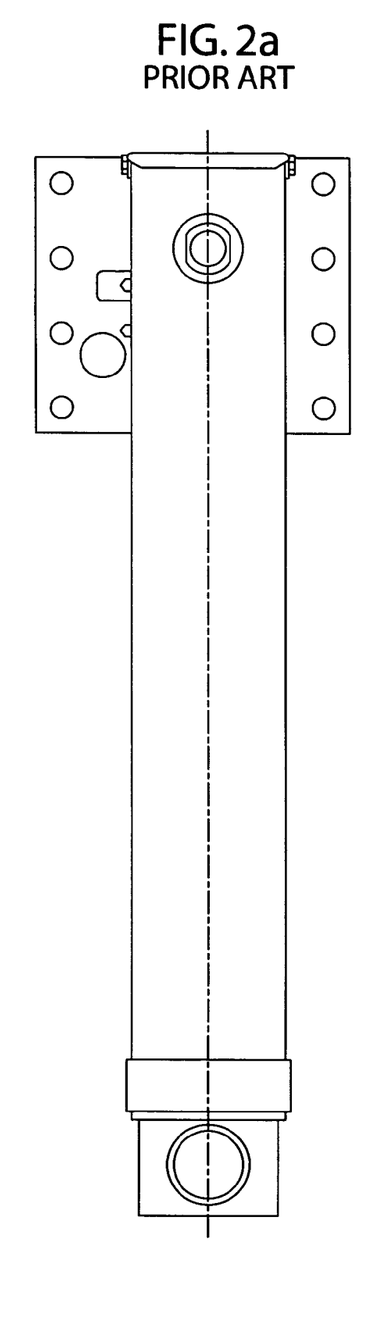
FIG. 2a is a side elevation of a leg of the prior art landing gear.
Figure 2B:
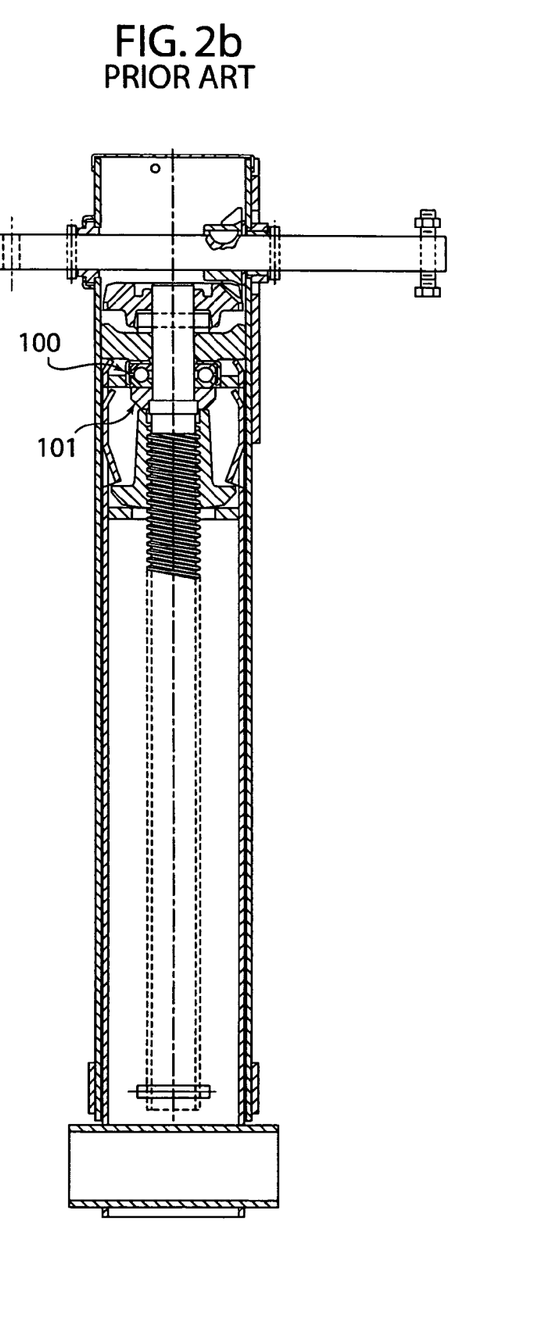
Figure 2C:
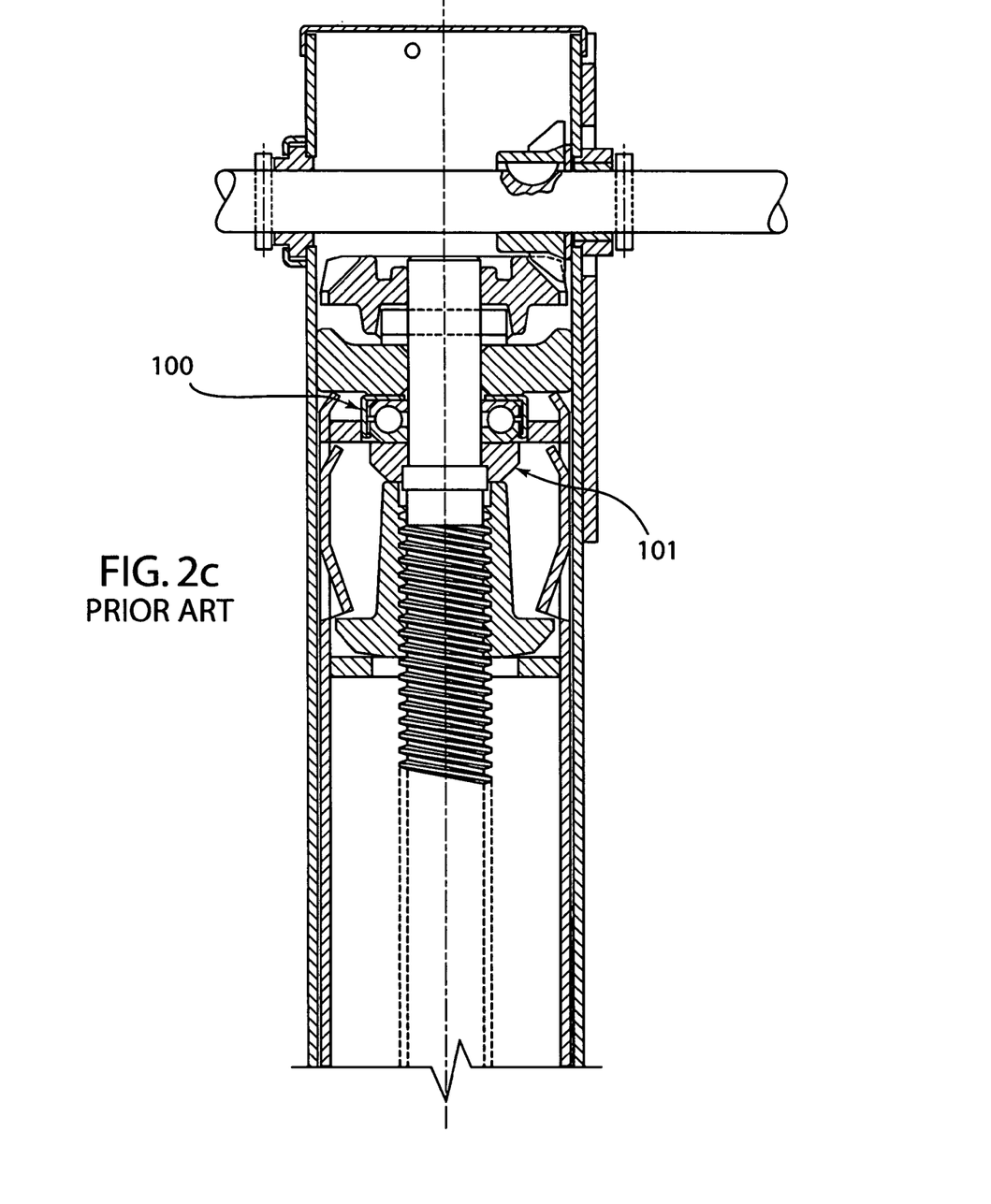
FIG. 2c is a fragmentary, enlarged view of a portion of the prior art landing gear of FIG. 2b.
Figure 3A:
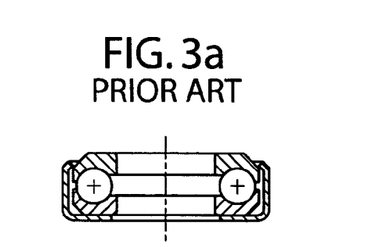
FIG. 3a is a cross section of the prior art thrust bearing taken in the plane of line A—A of FIG. 3b.
Figure 3B:
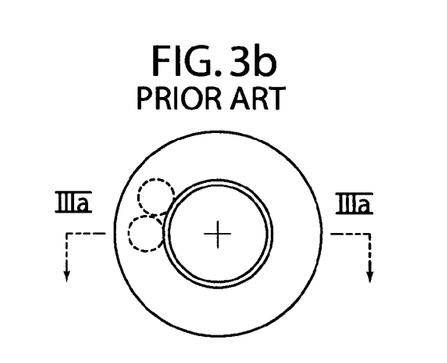
FIG. 3b is a top plan view of the prior art thrust bearing showing two ball bearings in phantom.
Figure 3C:
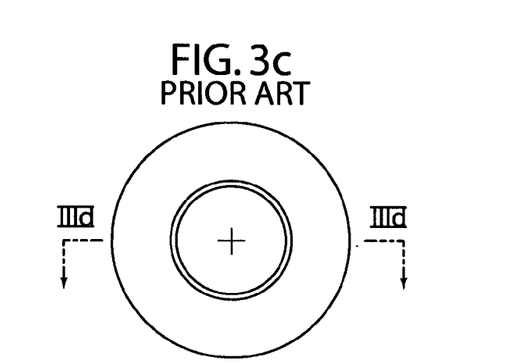
FIG. 3c is a top plan view of a prior art thrust bearing.
Figure 3D:
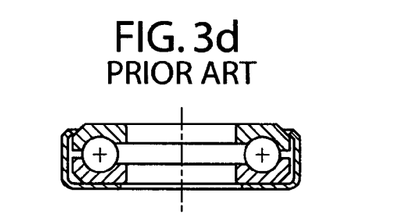
FIG. 3d is a cross section of a prior art thrust bearing taken in the plane of line A—A of FIG. 3c.
Figure 3E:
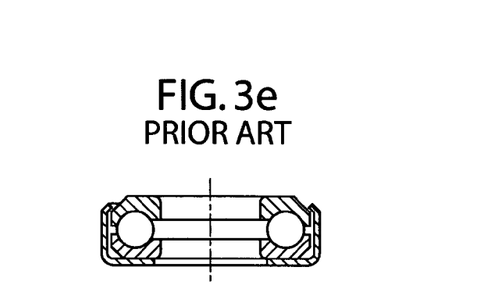
FIG. 3e is a cross section of a prior art thrust bearing.
Figure 4A:
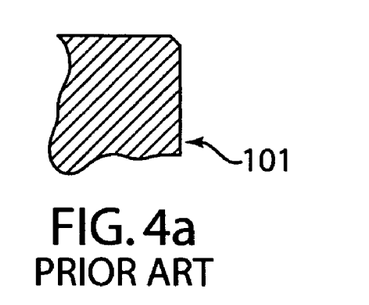
FIG. 4a is a partial fragmentary view of an outside corner of the prior art collar of FIG. 4c.
Figure 4B:
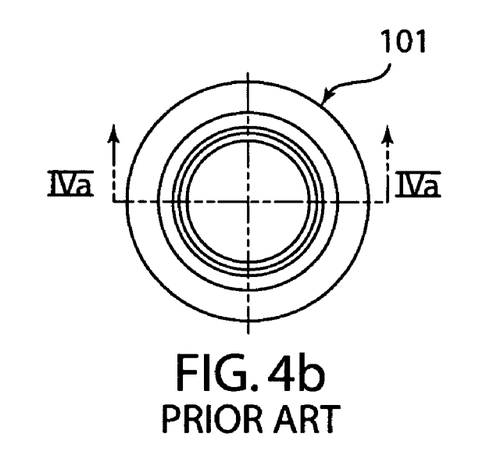
FIG. 4b is a top plan view of a prior art collar.
Figure 4C:
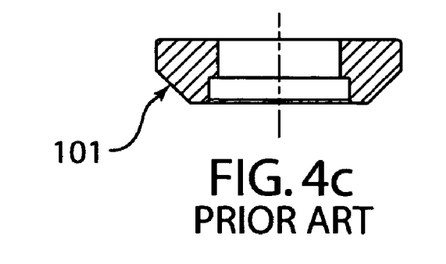
FIG. 4c is a cross section of a prior art collar.

Referring now to the prior art, shown in FIGS. 2–4, free rotation along the engagement faces of the screw shaft and upper leg section is enabled by the use of a bearing block, a collar 101 and a separate thrust bearing 100. The bearing block, which also acts as a bushing to center the shaft in the body, is welded inside the upper leg section to support the shaft in a generally fixed longitudinal position with respect to the body. A thrust bearing is mounted on the shaft below the bearing block to journal the shaft for rotation on its axis. The collar, which is adjacent the thrust bearing, is a separate part that is mounted on the shaft below the bearing to distribute loads from the bearing to the shaft. The shaft is formed with a shoulder for engaging a mating shoulder of the collar and preventing the collar from moving axially downward along the shaft. The bearing 100 (FIG. 2c) and collar 101 are separate parts.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

The invention claimed is:

1. An extensible leg assembly, comprising:
   a first leg member;
   a second leg member interconnected with the first leg member for relative axial movement;
   a rotating shaft having threads thereon;
   a threaded member threadably engaging the rotating shaft and transmitting thrust forces between the second leg member and the rotating shaft; and
   an axial thrust bearing for receiving thrust loads along the axis of a rotating shaft, the thrust bearing comprising:
   a first bearing member having a race formed therein;
   a second bearing member having a race formed therein at an inner side of the second bearing member;
   at least one roller member received in the races of the first and second bearing members for permitting relative rotating motion of the first and second bearing members about a rotational axis defined by the axial thrust bearing, and wherein the second bearing member has a bore therethrough defining a first inner diameter, and a surface adjacent an outer side of the second bearing member defining a second diameter that is larger than the first diameter, the second bearing member further including an annular bearing shoulder extending between the bore and the cylindrical surface, the bearing shoulder engaging the rotating shaft to transmit axial forces between the shaft and the thrust bearing.

2. The extensible leg assembly of claim 1, wherein:
   the rotating shaft includes an annular shoulder engaging the bearing shoulder.

3. The extensible leg assembly of claim 1, wherein:
   the second leg member comprises a tubular upper leg member; and
   the first leg member comprises a lower leg member telescopically received in the upper leg member.

4. The extensible leg assembly of claim 1, wherein:
   the first and second bearing members have inner and outer faces defining thicknesses therebetween, wherein the thickness of the second bearing member is substantially greater than the thickness of the first bearing member.

5. The extensible leg assembly of claim 1, wherein;
   the second bearing member has a conical outer surface portion.

6. The extensible leg assembly of claim 1, wherein:
   the at least one roller member comprises a plurality of spherical ball bearing members.

7. The extensible leg assembly of claim 1, including:
   a bearing block fixed to the first leg member and engaging the first bearing member to transmit thrust forces.

8. The extensible leg assembly of claim 1, including:
   a gear connected to an upper end of the rotating shaft.

9. The extensible leg assembly of claim 1, wherein:
   the first and second bearing members have a ring-like shape with cylindrical inner surfaces and annular outer surfaces, and annular races on inner faces of the first and second bearing members, wherein the races are closer to the inner surfaces than to the outer surfaces.

10. The extensible leg assembly of claim 9, wherein:
    the thrust bearing includes a sleeve interconnecting the first and second bearing members.

11. An axial thrust bearing for receiving thrust loads along the axis of a rotating shaft, the thrust bearing comprising:
    a first bearing member having a race formed therein;
    a second bearing member having a race formed therein at an inner side of the second bearing member;
    at least one roller member received in the races of the first and second bearing members for permitting relative rotating motion of the first and second bearing members about, a rotational axis defined by the axial thrust bearing, and wherein:
    the second bearing member has a bore therethrough defining a first inner diameter, and a cylindrical surface adjacent an outer side of the second bearing member defining a second diameter that is larger than the first diameter, the second bearing member further including an annular bearing shoulder extending between the bore and the cylindrical surface, the bearing shoulder configured to engage a rotating shaft to transmit axial forces between the shaft and the thrust bearing.

12. The thrust bearing of claim 11, wherein:
    the second bearing member has an outer surface, a portion thereof being conical.

13. The thrust bearing of claim 11, wherein:
    the bearing members comprise ball bearings.

14. The thrust bearing of claim 11, including:
    a sleeve interconnecting the first and second bearing members.

15. The thrust bearing of claim 11, wherein:

the races of the first and second bearing members are positioned closer to the inner bore surfaces of the first and second bearing members than to outer cylindrical surfaces of the first and second bearing members.

16. A telescoping leg assembly for supporting semitrailers, the leg assembly comprising:

an outer leg member defining an axis and having an internal cavity, the outer leg member defining a first transverse bearing surface extending transverse to the axis;

an inner leg member telescopically received in the outer leg member;

an internally threaded nut member connected to the inner leg member;

an externally threaded screw member threadably engaging the nut member and operably interconnecting the inner leg member to the outer leg member, the screw member having a second transverse bearing surface extending transverse to an axis of the screw member;

a thrust bearing transmitting axial loads from the screw member to the outer leg member having a first side portion, a second side portion opposite the first side portion, and an intermediate portion in between the first and second side portions, the thrust bearing including a first bearing member on the first side of the thrust bearing and a second bearing member on the second side of the thrust bearing, wherein each of the first and second bearing members include a race on an inner face thereof, the thrust bearing including a plurality of rollers at the intermediate portion engaging the races to provide relative rotation of the first and second bearing members and transmit force therebetween, the first bearing member having a first outer face surface at the first side of the thrust bearing transmitting forces to the first transverse bearing surface of the outer leg member, the second bearing member having a second outer face surface at the second side portion of the thrust bearing transmitting forces to the second transverse bearing surface of the screw member; and the first bearing member defining a first thickness between the inner face thereof and the first outer face surface, the second bearing member defining a second thickness between the inner face thereof and the second outer face surface, wherein the second thickness is substantially greater than the first thickness.

17. A telescoping leg assembly for supporting semitrailers, the leg assembly comprising:

an outer leg member defining an axis and having an internal cavity, the outer leg member defining a first transverse bearing surface extending transverse to the axis;

an inner leg member telescopically received in the outer leg member;

an internally threaded nut member connected to the inner leg member;

an externally threaded screw member threadably engaging the nut member and operably interconnecting the inner leg member to the outer leg member, the screw member having a second transverse bearing surface extending transverse to an axis of the screw member;

a thrust bearing transmitting axial loads from the screw member to the outer leg member having first and second bearing members, each of which includes a race on an inner face thereof, the thrust bearing including a plurality of rollers engaging the races to provide relative rotation of the first and second bearing members and transmit force therebetween, the first bearing member having a first outer face surface transmitting forces to the first transverse bearing surface of the outer leg member, the second bearing member having a second outer face surface transmitting forces to the second transverse bearing surface of the screw member;

the first bearing member defining a first thickness between the inner face thereof and the first outer face surface, the second bearing member defining a second thickness between the inner face thereof and the second outer face surface, wherein the second thickness is substantially greater than the first thickness; and the second outer face surface comprises an annular shoulder extending between a cylindrical bore having a first diameter and a cylindrical wall portion having a second diameter that is substantially greater than the first diameter.

18. The telescoping leg assembly of claim 17, wherein:

the first transverse bearing surface is formed by a bearing block in the internal cavity, the bearing block fixed to the outer leg member.

19. The telescoping leg assembly of claim 18, wherein:

the second transverse bearing surface is formed by an annular shoulder of the screw member.

20. The telescoping leg assembly of claim 19, wherein:

the inner and outer legs have a tubular construction.

21. The telescoping leg assembly of claim 20, including:

a gear connected to the screw member for rotatably driving the screw member.

* * * * *